(12) United States Patent
Dyer

(10) Patent No.: US 11,000,784 B2
(45) Date of Patent: May 11, 2021

(54) VACUUM SYSTEM FOR FUEL DEGASSING

(71) Applicant: Hamilton Sundstrand Corporation, Charlotte, NC (US)

(72) Inventor: Gerald P. Dyer, Suffield, CT (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 47 days.

(21) Appl. No.: 15/683,475

(22) Filed: Aug. 22, 2017

(65) Prior Publication Data
US 2019/0060791 A1 Feb. 28, 2019

(51) Int. Cl.
| | |
|---|---|
| *B01D 19/00* | (2006.01) |
| *B64D 37/34* | (2006.01) |
| *F04B 39/16* | (2006.01) |
| *F16K 21/04* | (2006.01) |
| *B64D 37/00* | (2006.01) |
| *F04B 39/00* | (2006.01) |
| *B60K 15/035* | (2006.01) |
| *B67D 7/76* | (2010.01) |
| *F15B 21/044* | (2019.01) |
| *F16K 24/04* | (2006.01) |

(52) U.S. Cl.
CPC ..... *B01D 19/0063* (2013.01); *B01D 19/0031* (2013.01); *B64D 37/005* (2013.01); *B64D 37/34* (2013.01); *F04B 39/0016* (2013.01); *F04B 39/16* (2013.01); *F16K 21/04* (2013.01); *B60K 15/03519* (2013.01); *B60K 2015/03585* (2013.01); *B67D 7/76* (2013.01); *F15B 21/044* (2013.01); *F16K 24/048* (2013.01); *F23K 2900/05082* (2013.01)

(58) Field of Classification Search
CPC ...... B01D 19/00; B01D 19/0042; E03D 1/00; F02M 33/02; F04B 35/00
See application file for complete search history.

(56) References Cited

U.S. PATENT DOCUMENTS

| | | | |
|---|---|---|---|
| 3,620,652 A | 11/1971 | Jaspers et al. | |
| 3,888,274 A * | 6/1975 | Weston | B01D 19/0063 137/174 |
| 4,102,609 A | 7/1978 | Wood | |

(Continued)

FOREIGN PATENT DOCUMENTS

| | | |
|---|---|---|
| DE | 222892 C | 6/1910 |
| DE | 10041555 A1 | 3/2002 |

(Continued)

OTHER PUBLICATIONS

European Search Report for Application No. 18189721.6-1010, dated Dec. 4, 2018, 10 pages.

(Continued)

*Primary Examiner* — Youngsul Jeong
(74) *Attorney, Agent, or Firm* — Cantor Colburn LLP

(57) ABSTRACT

A vacuum assembly includes a housing and a movable assembly positioned within the housing. Movement of the movable assembly relative to the housing creates a low pressure area. A fluid flow conduit is in fluid communication with the low pressure area. A leakage valve is disposed within the fluid flow conduit and is movable between a first position and a second position to restrict a flow through the fluid flow conduit upon detection of an undesired fluid within the low pressure area.

16 Claims, 6 Drawing Sheets

(56) References Cited

U.S. PATENT DOCUMENTS

| | | | |
|---|---|---|---|
| 4,391,184 A | | 7/1983 | Yamane et al. |
| 4,524,793 A | * | 6/1985 | Silverwater .......... F15B 21/044 |
| | | | 137/183 |
| 5,299,917 A | | 4/1994 | Schultz |
| 5,494,410 A | | 2/1996 | Maier-Laxhuber et al. |
| 6,315,815 B1 | | 11/2001 | Spadaccini et al. |
| 6,494,938 B2 | | 12/2002 | Sims et al. |
| 7,569,099 B2 | | 8/2009 | Coffin |
| 8,291,928 B2 | | 10/2012 | Reid et al. |
| 8,679,226 B2 | | 3/2014 | Parsons |
| 8,741,029 B2 | | 6/2014 | Cordatos et al. |
| 9,267,464 B2 | | 2/2016 | Ulrey et al. |
| 9,566,553 B2 | | 2/2017 | Theodore et al. |
| 9,604,837 B2 | | 3/2017 | Brown et al. |
| 10,118,109 B1 | | 11/2018 | Dyer |
| 2005/0137441 A1 | | 6/2005 | Cordatos et al. |
| 2007/0163433 A1 | | 7/2007 | Chen et al. |
| 2008/0231650 A1 | | 9/2008 | Kojima et al. |
| 2008/0257146 A1 | | 10/2008 | Spadaccini et al. |
| 2010/0030151 A1 | | 2/2010 | Kirsch |
| 2010/0294128 A1 | | 11/2010 | Schmidt et al. |
| 2012/0186562 A1 | | 7/2012 | Achor |
| 2013/0047845 A1 | | 2/2013 | Sampath |
| 2013/0343934 A1 | | 12/2013 | Du |
| 2015/0078919 A1 | | 3/2015 | Hong et al. |
| 2015/0176715 A1 | | 6/2015 | Huang et al. |
| 2016/0136821 A1 | | 5/2016 | Vaughn |
| 2019/0083905 A1 | | 3/2019 | Dyer |

FOREIGN PATENT DOCUMENTS

| | | |
|---|---|---|
| EP | 1810742 B1 | 7/2007 |
| EP | 3446982 A1 | 2/2019 |
| EP | 3456944 A1 | 3/2019 |
| FR | 2999653 A1 | 6/2014 |

OTHER PUBLICATIONS

European Search Report for Application No. 18189736.4-1010, dated Jan. 4, 2019, 8 pages.

European Search Report for Application No. 18193861.4-1007 dated Feb. 12, 2019, 6 pages.

European Search Report for Application No. 19152158.2 dated Jun. 11, 2019, 11 pages.

Non-Final Office Action; U.S. Appl. No. 15/706,078; dated Jun. 7, 2019; 7 Pages.

European Office Action; International Application No. 18189721.6-1010; International Filing Date: Aug. 20, 2018; dated May 27, 2020; 5 pages.

European Office Action; International Application No. 18189736.4-1010; International Filing Date: Aug. 20, 2018; dated Jun. 9, 2020; 6 pages.

U.S. Non-Final Office Action; U.S. Appl. No. 15/877,025; Application Filing Date: Jan. 22, 2018; dated Sep. 17, 2020; 41 pages.

* cited by examiner

VACUUM SYSTEM FOR FUEL DEGASSING

BACKGROUND

This invention generally relates to fuel systems, and more particularly, to stabilization of fuel via deoxygenation systems.

Aircraft fuel is often utilized as a coolant for various aircraft systems. The presence of dissolved oxygen in aircraft fuel may be objectionable because the oxygen supports oxidation reactions that may yield undesirable by-products. When aerated fuel is heated above 250° F., the oxygen contained therein initiates free radical reactions resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

BRIEF DESCRIPTION

According to one embodiment, a vacuum assembly includes a housing and a movable assembly positioned within the housing. Movement of the movable assembly relative to the housing creates a low pressure area. A fluid flow conduit is in fluid communication with the low pressure area. A leakage valve is disposed within the fluid flow conduit and is movable between a first position and a second position to restrict a flow through the fluid flow conduit upon detection of an undesired fluid within the low pressure area.

In addition to one or more of the features described above, or as an alternative, in further embodiments the leakage valve further comprises: a body arranged in fluid communication with fluid flow conduit and a biasing mechanism coupled to the body. A biasing force of the biasing mechanism retains the body in a first position.

In addition to one or more of the features described above, or as an alternative, in further embodiments in the first position, both a first end and a second end of the body are in fluid communication with the fluid flow conduit.

In addition to one or more of the features described above, or as an alternative, in further embodiments in the second position, the second end of the body is not in fluid communication with the fluid flow conduit.

In addition to one or more of the features described above, or as an alternative, in further embodiments the leakage valve transforms from the first position to the second position in response to the body being filled with a viscous fluid.

In addition to one or more of the features described above, or as an alternative, in further embodiments a pressure drop generated by the viscous fluid overcomes the biasing force of the biasing mechanism.

In addition to one or more of the features described above, or as an alternative, in further embodiments the viscous fluid is fuel.

In addition to one or more of the features described above, or as an alternative, in further embodiments comprising a check valve disposed within fluid flow conduit upstream from the leakage protection valve.

In addition to one or more of the features described above, or as an alternative, in further embodiments comprising a biasing mechanism coupling the movable assembly to the housing.

In addition to one or more of the features described above, or as an alternative, in further embodiments the movable assembly is movable in response to one or more pressures applied to the movable assembly by one or more sources external to the housing.

In addition to one or more of the features described above, or as an alternative, in further embodiments the movable assembly includes a first portion and a second portion, a first chamber being formed between the housing and the first portion, a second chamber being formed between the housing and the second portion, and a third chamber being formed between the housing and part of the movable assembly between the first portion and the second portion.

In addition to one or more of the features described above, or as an alternative, in further embodiments the second chamber is fluidly connected to ambient air.

In addition to one or more of the features described above, or as an alternative, in further embodiments the third chamber is fluidly connected to a fuel pump.

In addition to one or more of the features described above, or as an alternative, in further embodiments the first chamber is fluidly connected to a deoxygenation system and the low pressure area is formed within the first chamber.

In addition to one or more of the features described above, or as an alternative, in further embodiments the movable assembly includes a piston.

In addition to one or more of the features described above, or as an alternative, in further embodiments the movable assembly includes a rolling diaphragm.

According to another embodiment, a fuel system includes a deoxygenation system, a fuel pump for providing fuel to the deoxygenation system, and a vacuum operably coupled to the deoxygenation system to selectively remove oxygen from fuel within the deoxygenation system. The vacuum is operable automatically in response to one or more pressures external to the vacuum. A fluid flow conduit evacuates oxygen from the vacuum and a leakage valve is disposed within the fluid flow conduit. The leakage valve is operable to restrict a flow through the fluid flow conduit upon detection of an undesired fluid within the vacuum.

In addition to one or more of the features described above, or as an alternative, in further embodiments the leakage valve transforms from a first position to a second position in response to detection of the undesired fluid, the undesired fluid being fuel.

In addition to one or more of the features described above, or as an alternative, in further embodiments the leakage valve further comprises: a body arranged in fluid communication with fluid flow conduit and a biasing mechanism coupled to the body to retain the body in a first position. A pressure drop generated by the undesired fluid is configured to overcome the biasing force of the biasing mechanism.

In addition to one or more of the features described above, or as an alternative, in further embodiments the vacuum further comprises: a housing and a movable assembly movable within the housing between a first position and a second position. Movement of the movable assembly from the first position to the second position generates a low pressure area within the housing.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
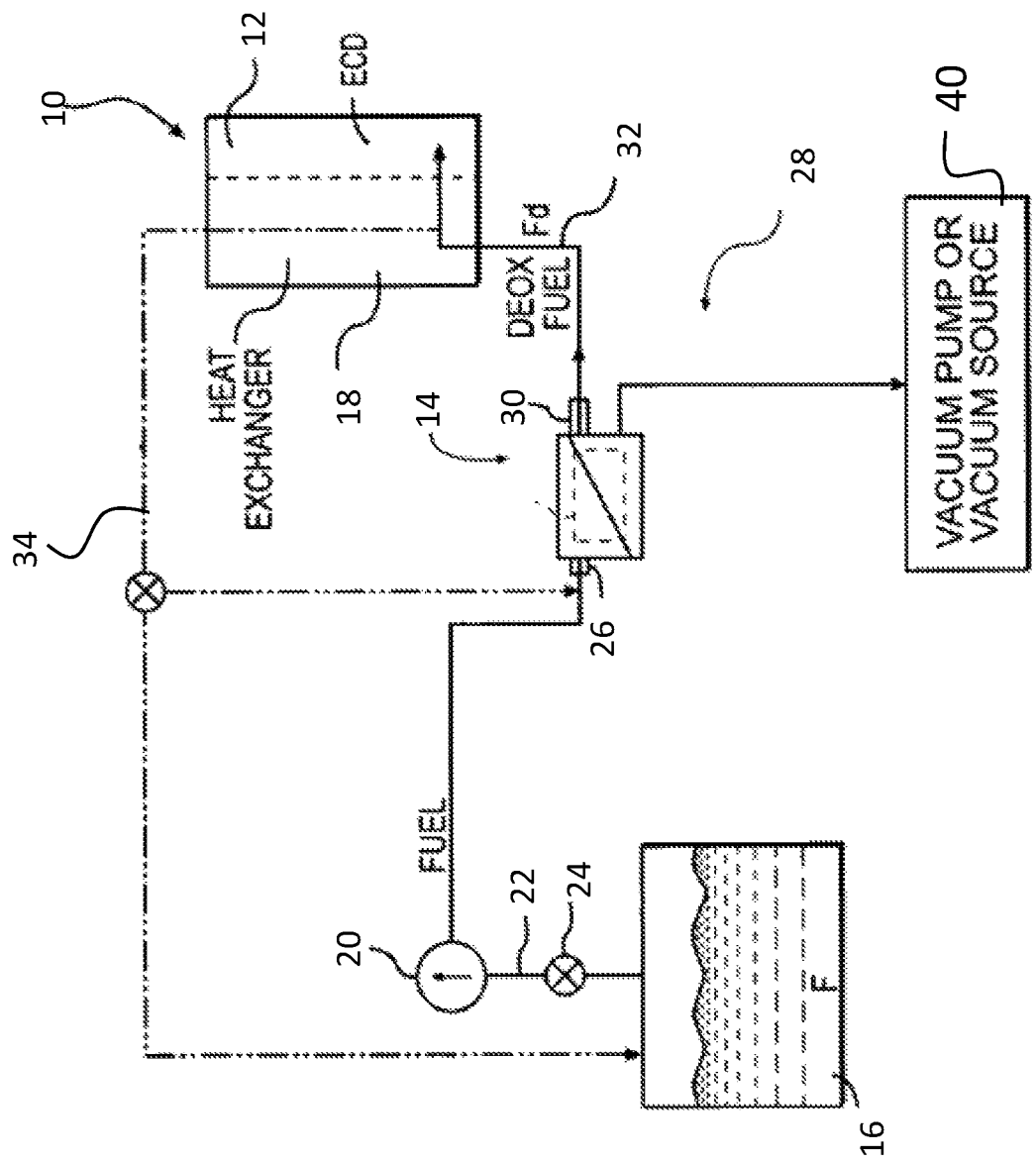
FIG. 1 is a schematic diagram of a fuel system.

Referring now to FIG. 1, an example of a schematic of a basic fuel system 10 for use with an energy conversion device 12 is illustrated. In an embodiment, the energy conversion device 12 includes a gas turbine engine, such as commonly used in vehicle including but not limited to a fixed or rotary wing aircraft for example. In embodiments where the energy conversion device 12 is an engine, the fuel configured to power the energy conversion device 12 may additionally serve as a coolant for one or more subsystems of the vehicle and becomes heated as it is delivered to the fuel injectors immediately prior to combustion.

The fuel system 10 includes a deoxygenator system 14 that receives a liquid fuel F from a reservoir 16, for example a fuel tank. The fuel F is typically a hydrocarbon, such as aircraft fuel for example. The energy conversion device 12 may exist in a variety of forms in which the fuel, at some point prior to eventual use for processing, such as combustion or some form of energy release, acquires sufficient heat to support autoxidation reactions and coking if dissolved oxygen is present in the fuel to any significant extent.

A heat exchange system 18 represents a system through which the fuel passes in a heat exchange relationship. It should be understood that the heat exchange section 18 may be directly associated with the energy conversion device 12 and/or distributed elsewhere in the larger fuel system 10. The heat exchange system 18 may alternatively or additionally include a plurality of heat exchanges distributed throughout the system 10.

As generally understood, fuel F stored in the reservoir 16 normally contains dissolved oxygen, such as at a saturation level of 70 ppm for example. However, it should be understood that a fuel having any level of dissolved oxygen is contemplated herein. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a vacuum system 28.

The deoxygenated fuel $F_d$ flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel $F_d$ may be recirculated, as represented by recirculation conduit 34 to either the deoxygenation system 14 and/or the reservoir 16. It should be understood that although a particular component arrangement is disclosed in the illustrated embodiment, other arrangements are also considered within the scope of the disclosure.

Figure 2:
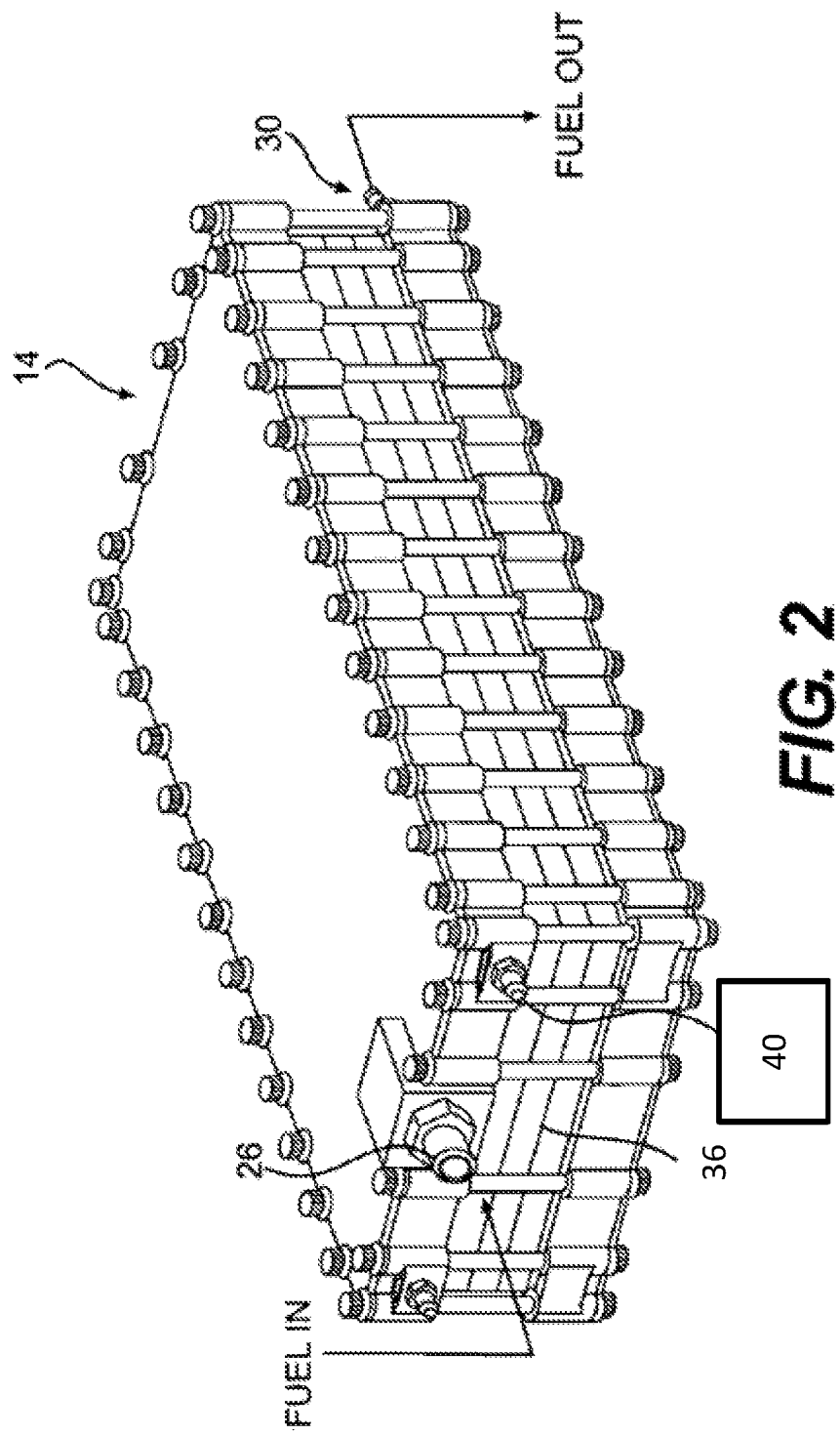
FIG. 2 is perspective view of a deoxygenation system according to an embodiment.
Figure 3:
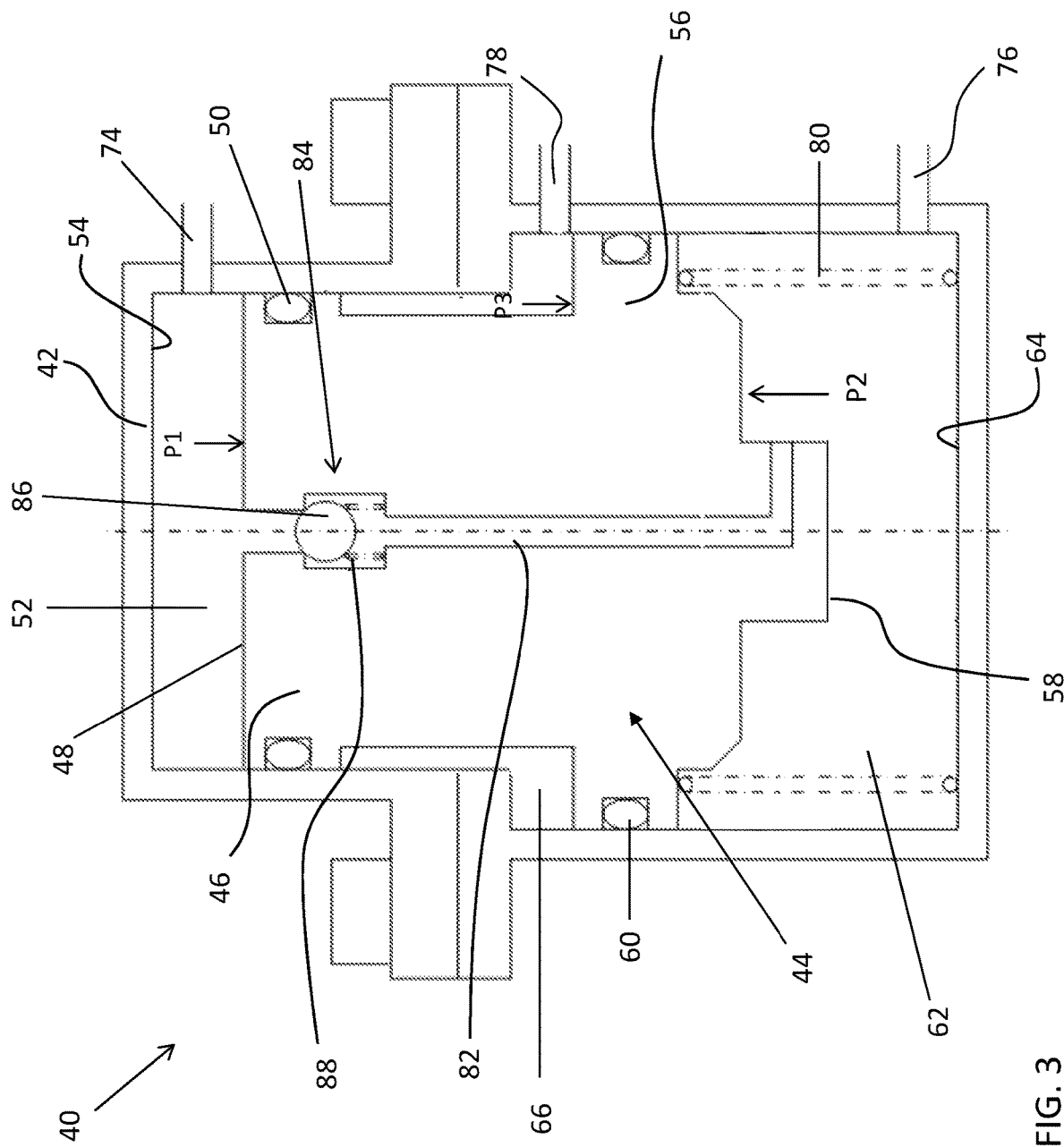
FIG. 3 is a cross-sectional diagram of a vacuum system of the fuel system according to an embodiment.

Referring to FIG. 2, in the illustrated, non-limiting embodiment, the deoxygenator system 14 includes a multiplicity of gas/fuel micro-channel assemblies 36. The assemblies 36 include a composite oxygen permeable membrane (not shown) between a fuel channel (not shown) and an oxygen receiving vacuum assembly 40 which permits the flow of nitrogen and/or another oxygen-free gas (FIG. 3). It should be understood that the channels may be of various shapes and arrangements to provide a pressure differential, which maintains an oxygen concentration differential across the membrane to deoxygenate the fuel. The composite oxygen permeable membrane preferably includes oxygen permeable membranes, which allow dissolved oxygen (and other gases) to diffuse through angstrom-size voids but exclude the larger fuel molecules, and permeable membranes which use a solution-diffusion mechanism to dissolve the oxygen (and/or other gases) and allow it (or them) to diffuse through the membrane, while excluding the fuel.

Figure 4:
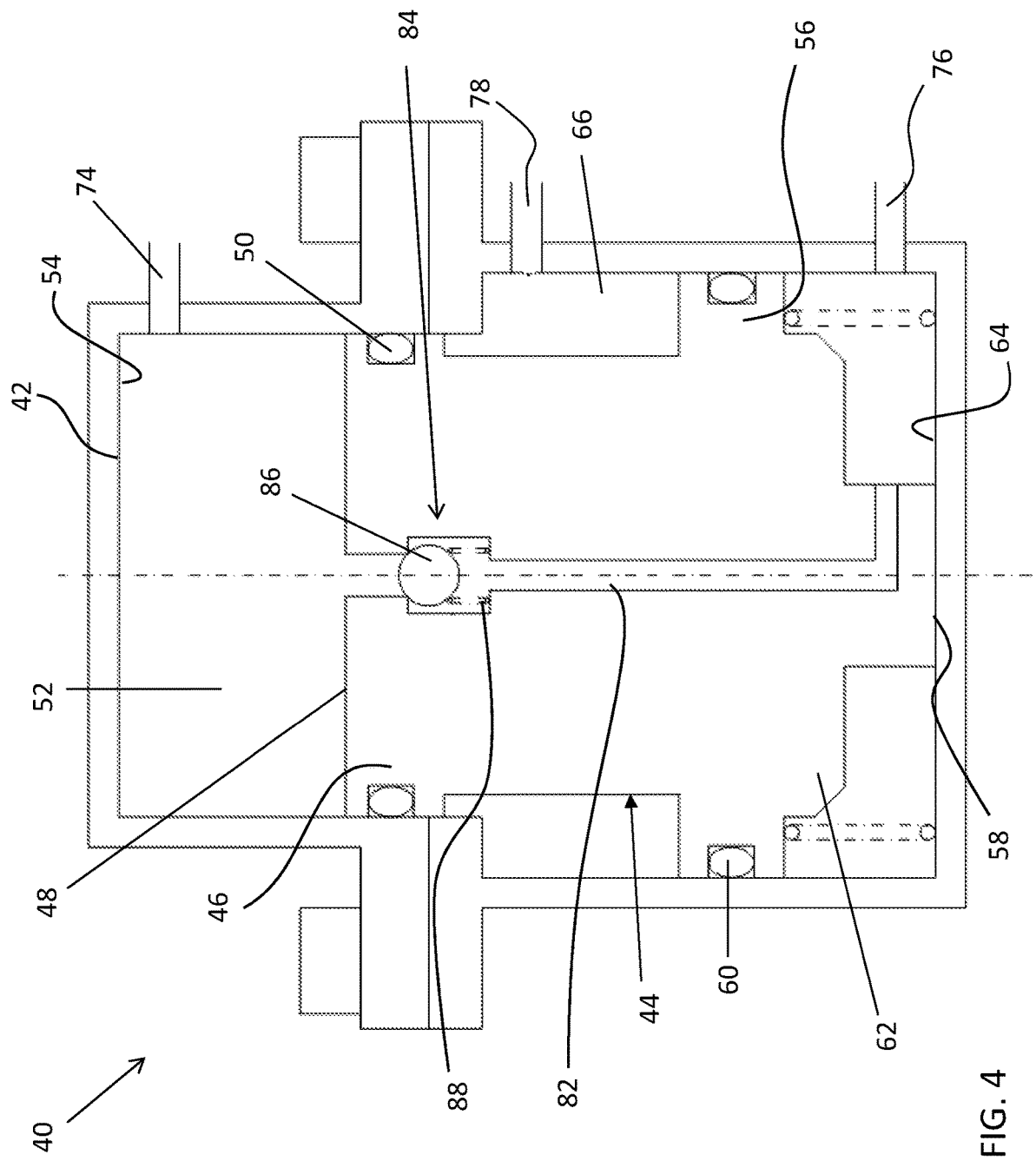
FIG. 4 is a cross-sectional diagram of another vacuum system of the fuel system according to an embodiment.
Figure 5:
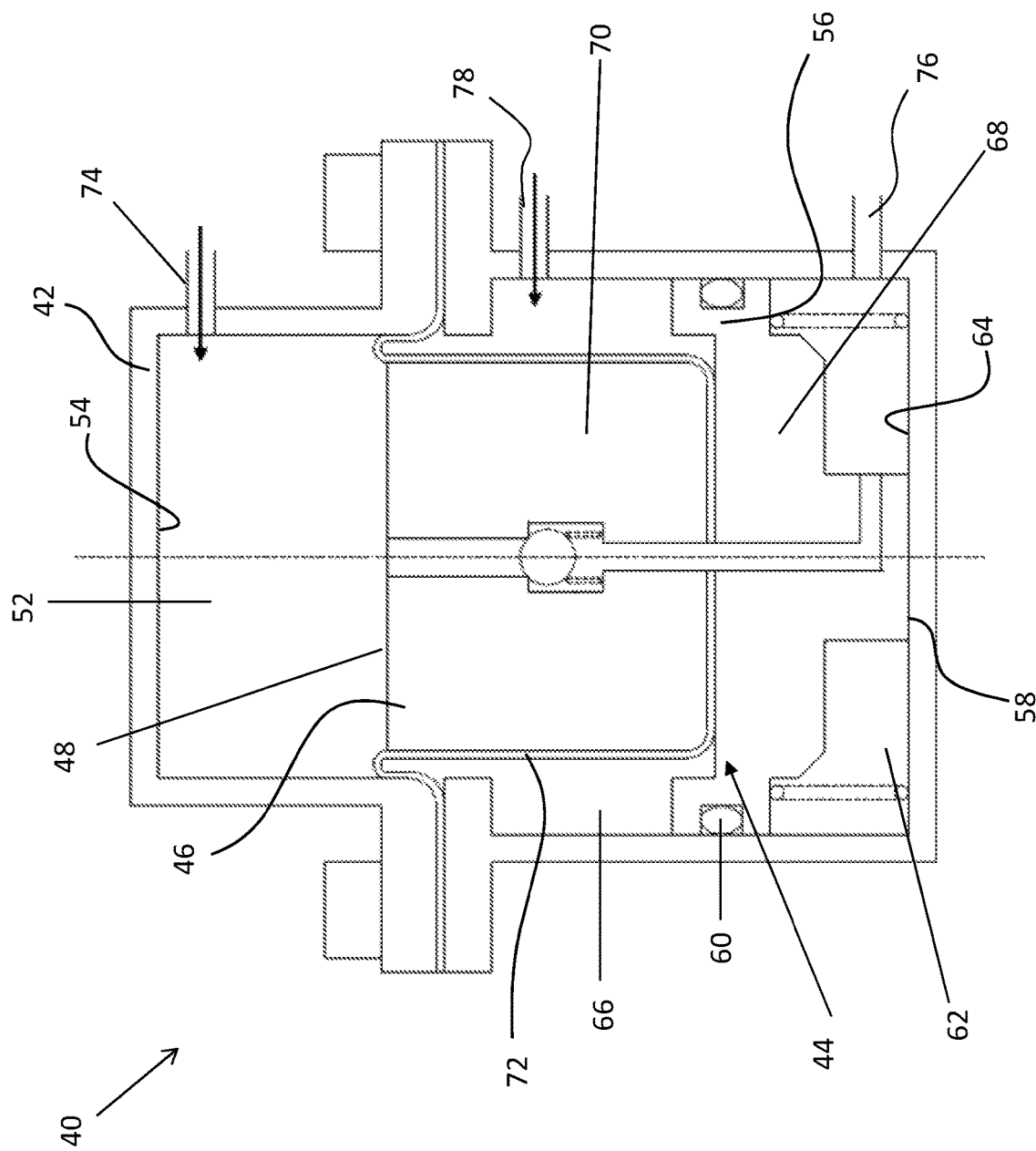
FIG. 5 is a cross-sectional diagram of a vacuum system of the fuel system according to an embodiment.

With reference now to FIGS. 3-5, the oxygen receiving vacuum assembly 40 is illustrated in more detail. As shown, the vacuum assembly 40 includes an enclosure or housing 42 having a generally hollow interior within which a movable assembly 44 is located. An outer diameter at a first portion 46 of the movable assembly 44, such as near a first end 48 for example, is generally complementary to the inner diameter of the adjacent housing 42. In an embodiment, an o-ring or other suitable device 50 extends between the first portion 46 of the movable assembly 44 and the housing 42 to form a seal preventing the flow of a fluid there between. As a result, a first chamber 52 is defined within the housing 42 between a first end 54 of the housing 42 and the first portion 46 of the movable assembly 44.

A second portion 56 of the movable assembly 44, located near a second end 58 of the movable assembly 44, similarly has an outer diameter generally complementary to the inner diameter of an adjacent portion of the housing 42. An additional o-ring or sealing mechanism 60 extends between the second portion 56 of the movable assembly 44 and the housing 42 to prevent a flow of fluid there between. Accordingly, a second chamber 62 is defined within the housing 42 between a second, opposite end 64 of the housing 42 and the second portion 56 of the movable assembly 44.

The first portion 46 and the second portion 56 of the movable assembly 44 are spaced apart from one another by a distance. A third chamber 66 is formed generally within the housing 42 between the first portion 46 and the second portion 46 of the movable assembly 44. The third chamber 66 may be formed by varying an outer diameter of the movable assembly 44 between the first and second portions 46, 56 and/or by varying an inner diameter of the housing 42 between the first and second portions 46, 56.

In the illustrated, non-limiting embodiment of FIGS. 3-4, the movable assembly 44 is a piston and the first and second portions 46, 56 are integrally formed therein. Alternatively, in the embodiment illustrated in FIG. 5, the movable assembly 44 includes a rolling diaphragm 70 coupled to a piston 68. In such embodiments, the third chamber 66 is defined between seal 72 of the diaphragm 70 and the upper surface of the piston 68.

A plurality of ports couple to the housing at various locations. In an embodiment, a first port 74 is disposed adjacent a first end 54 of the housing 42. The first port 74 fluidly couples the first chamber 52 to the deoxygenation system 14. A second port 76, disposed adjacent the second end 64 of the housing 42 is in fluid communication with ambient air, such as exterior to the energy conversion device 12, and in some embodiments to the vehicle. A third port 78 is arranged in fluid communication with the third chamber 66 and is associated with the fuel pump 20.

The movable assembly 44 is configured to move within the housing 42 in response to the pressure generated by the fluids communicated to each of the chambers 52, 62, 66 via ports 74, 76, 78. For example, a first pressure, indicated by arrow P1 is applied by a fluid within the first chamber 56 to the first end 48 of the movable assembly 44, a second pressure, indicated by arrow P2 is applied by the ambient air to the second portion 56 of the movable assembly 44, and a third pressure, indicated by arrow P3, is applied by the exhaust from the fuel pump 20 within the third chamber 66 to a portion of the movable assembly 44 between the first portion 46 and the second portion 56. In an embodiment, a biasing mechanism 80, such as a coil spring for example, couples the second end of the movable assembly 44 to an adjacent surface 64 of the housing 42. The biasing force of the biasing mechanism 80 is configured to bias the movable assembly 44 towards a first position, such as shown in FIG. 3 for example.

The fluid communicated to the interior of the housing 42 through each of the plurality of ports 74, 76, 78 is dependent on a mode of operation of the vehicle. For example, when an aircraft is grounded and the energy conversion device 12 is non-operational, or is operating in a reduced mode, the pressure P2 generated by the ambient air is greater than the combination of the pressure P3 of the fuel pump 20 and the pressure P1 of the fluid within the first chamber 52. As a result, the biasing mechanism 80 biases the movable assembly 44 to the first position.

When the energy conversion device 12 is operational, for example when the aircraft is in a flight condition where the ambient air pressure is substantially reduced, such as when the aircraft is cruising at altitude, the pressure P2 generated by operation of the fuel pump 20 is greater than the pressure P3 of the ambient air. As a result, pressure P2 overcomes the biasing force of the biasing mechanism 80, causing the movable assembly 44 to transition within the housing 42 towards a second position, shown in FIG. 4. As the movable assembly 44 slides within the housing, such as along an axis for example, a vacuum is created within the first chamber 52. This vacuum is applied via port 74 to the deoxygenator system 14 causing the first chamber 52 to fill with oxygen evacuated from the fuel within the deoxygenator system 14. In an embodiment, the first chamber 52 defined between the housing 42 and the first portion 46 may be sized to retain all of the oxygen removed from the fuel for the entire duration of the flight.

In another embodiment, a fluid flow path 82 fluidly couples the first chamber 52 and the second chamber 62. A valve 84 is disposed within the fluid flow path 82 and is operable to selectively expel the evacuated oxygen from the first chamber 52. In the illustrated, non-limiting embodiment, the valve 84 includes a sealing member 86 biased into a first position to block a flow through the flow path. When the pressure within the first chamber 52 exceeds a threshold, the pressure will oppose the biasing force of the biasing member 88 of the valve 84, causing the sealing member 86 to move to a second position. In the second position, oxygen is able to flow through fluid flow path 82. Further, because of the low pressure within the second chamber 62, the fluid is drawn there into and then expelled into the atmosphere by movement of the aircraft. Alternatively, or in addition, the valve 84 may be selectively opened, such as via a solenoid for example, to allow oxygen to be removed from the first chamber 52 on demand. In an embodiment, the valve 84 is operated during the descent and/or landing of the aircraft.

Alternatively, or in addition, the oxygen within the first chamber 52 may be configured to pass through the fluid flow path 82 and valve 84 into the second chamber 62 when the aircraft is on the ground. The increase in ambient air pressure within the second chamber 62 will cause the biasing mechanism 80 to bias the movable assembly 44 towards the first position. As the movable assembly 44 translates within the housing, the oxygen within is forced to vent from the first chamber 52 to the second chamber 62.

Figure 6:
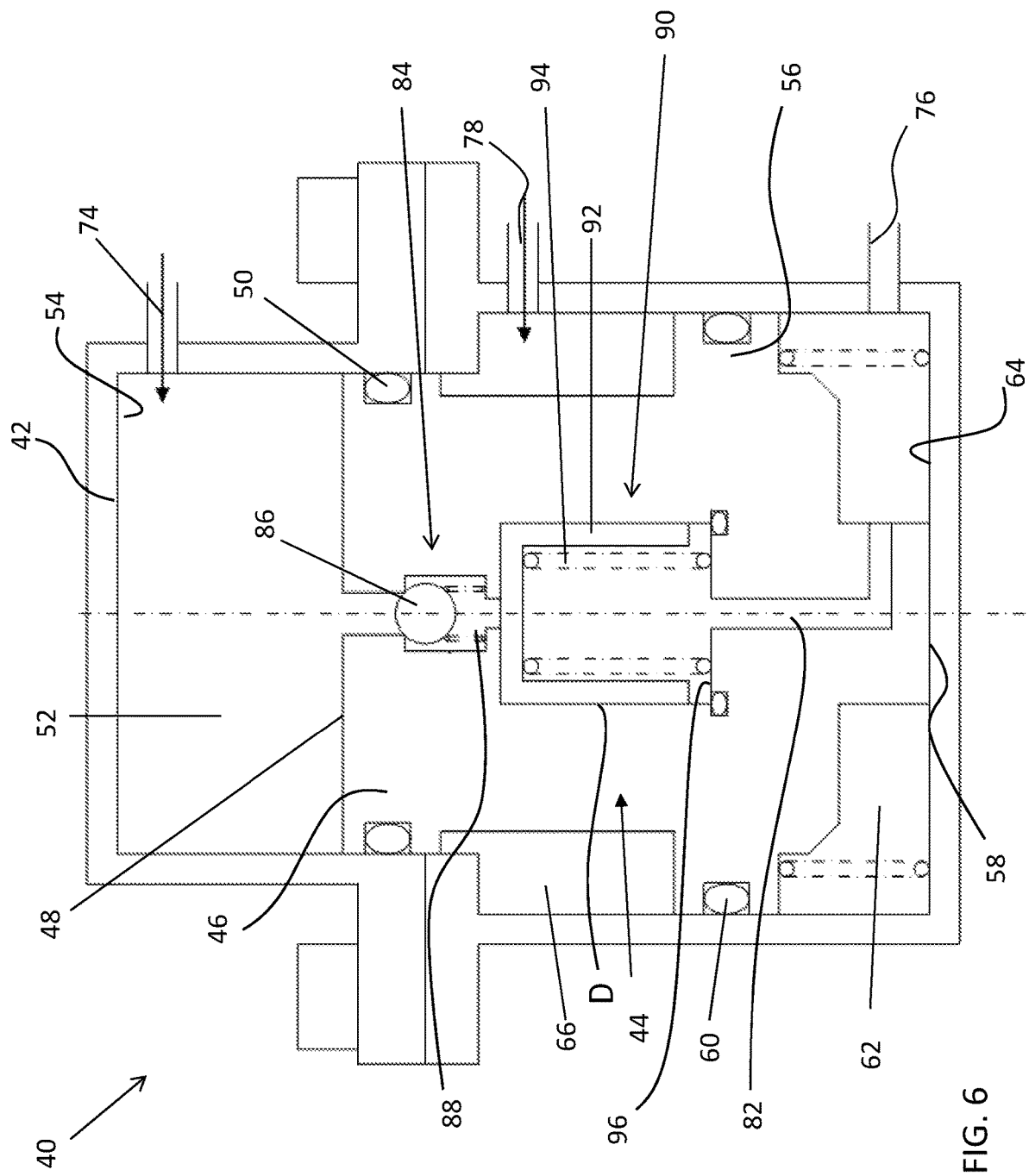
FIG. 6 is a cross-sectional diagram of a vacuum system of the fuel system according to another embodiment.

With reference now to FIG. 6, in an embodiment, an additional fuel leakage protection valve 90 may be disposed between the first chamber 52 and the second chamber 62, downstream of valve 84. The fuel leakage protection valve 90 includes a cylindrical body 92 and a biasing mechanism 94 extending between a surface 96 formed in the movable assembly 44 and a surface of the cylindrical body 92. Although the cylindrical body 92 as described herein having a generally hollow interior, embodiments where the cylindrical body is solid are also contemplated herein. Further the body 92 need not be cylindrical in shape. The biasing force of the biasing mechanism 94 is configured to maintain the cylindrical body 92 in a first position such that a clearance exists between an end of the cylinder 92 and the surface 96. When the cylindrical body 92 of the fuel leakage valve 90 is in the first position, oxygen from the first chamber 52 is configured to flow through the diametrical clearance D between the valve 90 and the movable assembly 44, and through the hollow interior of the cylindrical body 92 to an adjacent portion of the fluid flow path 82. However, if a viscous fluid is provided to the diametrical clearance D, such as in the event that the oxygen drawn into the first chamber 52 is laden with fuel, the pressure drop generated by the viscous fluid will oppose the biasing force of the biasing mechanism 94 causing the cylindrical body 92 to transition to a second position. In the second position, the end of the cylindrical body 92 is in direct contact with surface 96. As a result, no fluid is able to flow through the fuel leakage protection valve 90 to the downstream portion of the fluid flow path 82.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vacuum assembly comprising:
    a housing;
    a movable assembly positioned within the housing, a body of the movable assembly including an integrally formed first portion and a second portion, a first chamber being defined by an end of the first portion and a first end of the housing and a second chamber being defined by an end of the second portion and a second, opposite end of the housing, wherein movement of the movable assembly relative to the housing creates a low pressure area in the first chamber;
    a first port formed in the housing for delivering a first fluid to the first chamber;
    a second port formed in the housing for delivering a second fluid, distinct from the first fluid, to the first chamber;

a fluid flow conduit extending through the body of the movable assembly and fluidly coupling the first chamber and the second chamber, an inlet of the fluid flow conduit being located at the first portion of the movable assembly of the arranged in fluid communication with the first chamber, and an outlet of the fluid flow conduit being located at the second portion of the movable assembly in fluid communication with the second chamber;

a valve disposed along the fluid flow conduit; and a leakage valve disposed within the fluid flow conduit, the leakage valve being movable between a first valve position and a second valve position to restrict a flow through the fluid flow conduit upon detection of an undesired fluid within the low pressure area.

2. The vacuum assembly of claim 1, wherein the leakage valve further comprises:

a body arranged in fluid communication with fluid flow conduit; and a biasing mechanism coupled to the body arranged in the fluid flow conduit, wherein a biasing force of the biasing mechanism retains the body arranged in the fluid flow conduit in a first body position.

3. The vacuum assembly of claim 2, wherein in the first valve position, both a first end and a second end of the body arranged in the fluid flow conduit are in fluid communication with the fluid flow conduit.

4. The vacuum assembly of claim 3, wherein in the second valve position, the second end of the body arranged in the fluid flow conduit is not in fluid communication with the fluid flow conduit.

5. The vacuum assembly of claim 2, wherein the leakage valve transforms from the first valve position to the second valve position in response to the body arranged in the fluid flow conduit being filled with a viscous fluid.

6. The vacuum assembly of claim 5, wherein a pressure drop generated by the viscous fluid overcomes the biasing force of the biasing mechanism.

7. The vacuum assembly of claim 5, wherein the viscous fluid is fuel.

8. The vacuum assembly of claim 2, further comprising a check valve disposed within fluid flow conduit upstream from the leakage valve.

9. The vacuum assembly of claim 1, further comprising a biasing mechanism coupling the movable assembly to the housing.

10. The vacuum assembly of claim 1, wherein the movable assembly is movable in response to one or more pressures applied to the movable assembly by one or more sources external to the housing.

11. The vacuum assembly of claim 1, wherein a third chamber is formed between the housing and a part of the movable assembly between the first portion and the second portion.

12. The vacuum assembly of claim 11, wherein the second chamber is fluidly connected to ambient air.

13. The vacuum assembly of claim 11, wherein the third chamber is fluidly connected to a fuel pump.

14. The vacuum assembly of claim 11, wherein the first chamber is fluidly connected to a deoxygenation system and the low pressure area is formed within the first chamber.

15. The vacuum assembly of claim 1, wherein the movable assembly includes a piston.

16. The vacuum assembly of claim 7, wherein the movable assembly includes a rolling diaphragm.

* * * * *